Figure 1:
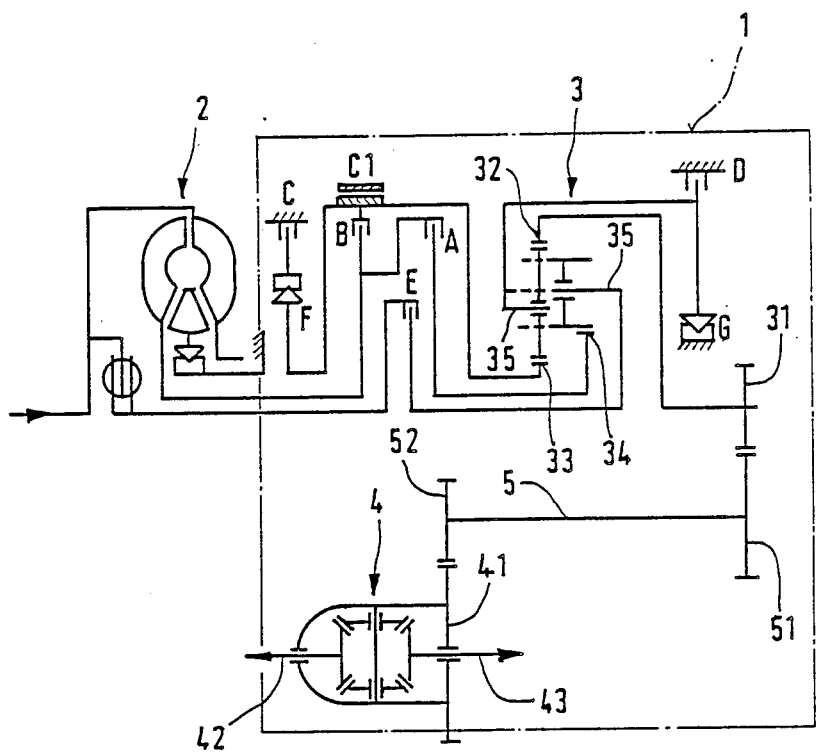

United States Patent [19]

Bucksch

[11] Patent Number: 4,793,210
[45] Date of Patent: Dec. 27, 1988

[54] COMPACT CONSTRUCTION FOR TRANSVERSELY MOUNTED TRANSMISSION

[75] Inventor: Manfred Bucksch, Friedrichshafen, Fed. Rep. of Germany

[73] Assignee: Zahnradfabrik Friedrichshafen, AG., Friedrichshafen, Fed. Rep. of Germany

[21] Appl. No.: 44,031
[22] PCT Filed: Jul. 23, 1986
[86] PCT No.: PCT/EP86/00431
 § 371 Date: Apr. 2, 1987
 § 102(e) Date: Apr. 2, 1987
[87] PCT Pub. No.: WO87/00901
 PCT Pub. Date: Feb. 12, 1987

[30] Foreign Application Priority Data
 Aug. 6, 1985 [WO] PCT Int'l Appl. .......... PCT/EP85/00397

[51] Int. Cl.$^4$ ............................................. F16H 37/08
[52] U.S. Cl. ........................................................ 74/695
[58] Field of Search ............................................. 74/695

[56] References Cited

U.S. PATENT DOCUMENTS

| | | | |
|---|---|---|---|
| 3,314,307 | 4/1967 | Egbert | 74/688 |
| 3,494,223 | 2/1970 | Mori et al. | 74/688 |
| 4,280,374 | 7/1981 | Kubo et al. | 74/695 |
| 4,346,622 | 8/1982 | Pierce | 74/688 |
| 4,468,982 | 9/1984 | Fujita | 74/762 |
| 4,594,914 | 6/1986 | Kubo et al. | 74/695 X |
| 4,653,346 | 3/1987 | Kato et al. | 74/695 X |
| 4,676,123 | 6/1987 | Kubo et al. | 74/695 |

FOREIGN PATENT DOCUMENTS

| | | |
|---|---|---|
| 0039936 | 11/1981 | European Pat. Off. |
| 2743581 | 4/1979 | Fed. Rep. of Germany . |
| 2830543 | 1/1980 | Fed. Rep. of Germany . |
| 7509913 | 1/1976 | France . |
| 0166749 | 9/1984 | Japan .................... 74/695 |
| 2076083 | 11/1981 | United Kingdom . |
| 2138517 | 10/1984 | United Kingdom . |

OTHER PUBLICATIONS

ZF brochure, "Automatgetriebe" (no date).
ZF brochure, "3HP22" (no date).
ZF brochure, "4HP14" (no date).

Primary Examiner—Dirk Wright
Attorney, Agent, or Firm—Albert M. Zalkind

[57] ABSTRACT

A gearing arrangement for a motor vehicle has a prime mover mounted transversely to the direction of travel. The arrangement provides for a change speed transmission (3) connected to the prime mover by way of a hydrodynamic torque converter (2). The speed changes are accomplished by using clutches (A, B, C); brakes (C, Cl, D) and one way clutches (F, G). Output to the final drive (4) of the vehicle is provided by gearing (51,52) on a shaft (5) which is parallel to and offset from the change speed transmission. At least one of the one way clutches is co-axial with the output support element (31) of the change speed transmission and has its reaction element (G1) in an end cover, 12 for the housing of the transmission. As a result of this arrangement a better utilization of the installation space and a weight reduction are realized.

4 Claims, 2 Drawing Sheets

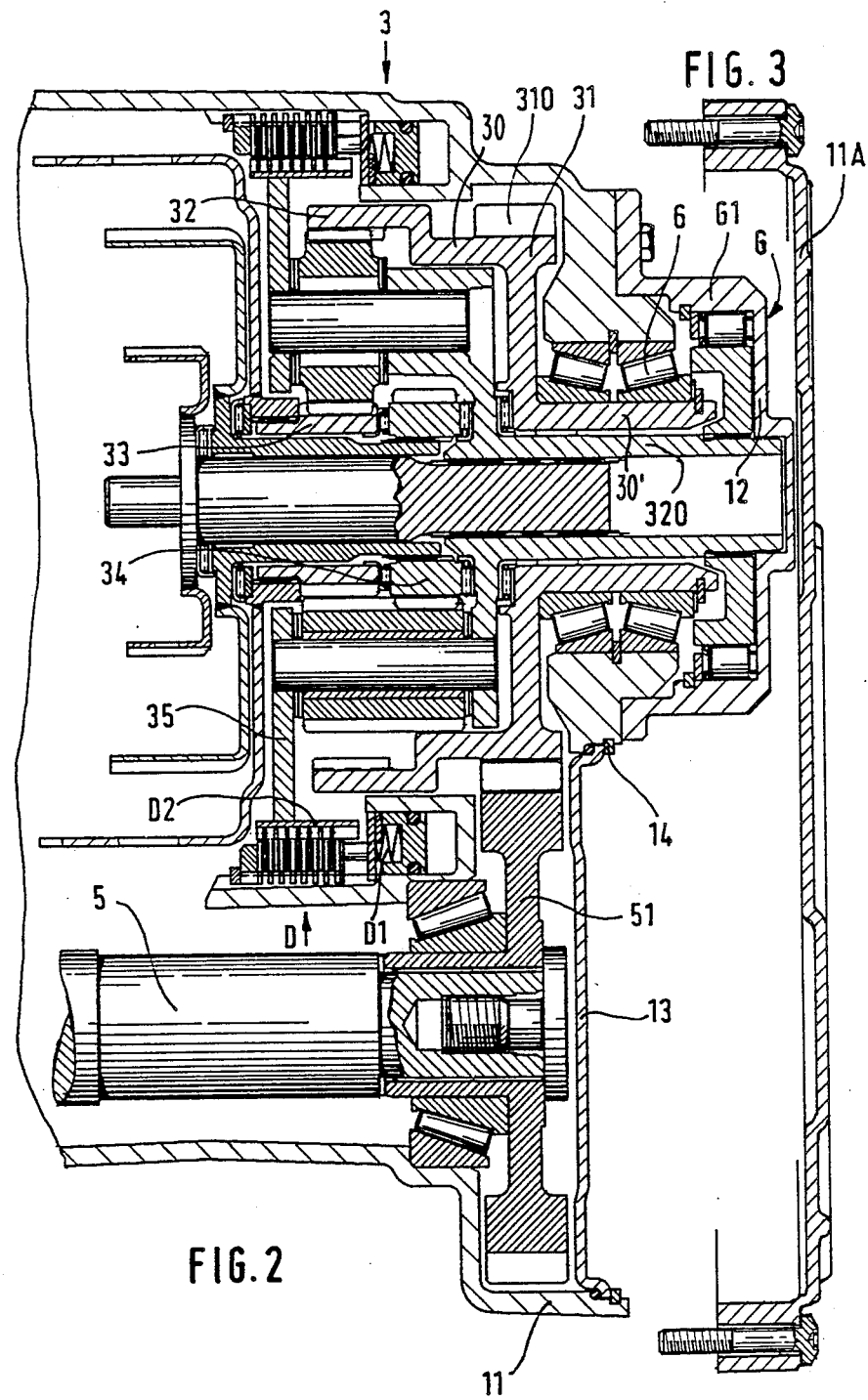

COMPACT CONSTRUCTION FOR TRANSVERSELY MOUNTED TRANSMISSION

BACKGROUND OF THE INVENTION

In front drive cars there exists a space problem for locating the motor and transmission coaxially transversely of the frame of the vehicle.

The prior art illustrates arrangements in brochures of the assignee of this application, identified as: F1/36 WH 816009, page 3, Sept. 1981 entitled ZF - Automatgetriebe fur Personenkraft - Wagen and Lerchte Nutzkraftwagen; and F 43/301 RT 3356-683 entitled as above including "mit Frontantriebe," indicated as "3HP22"; and F 43437/RT 3397-683, June 1983 same title as preceding identified brochure, indicated as "4HP14" and "4HP18," and International application PCT/EP No. 85/00292, published Dec. 18, 1986, U.S. Ser. No. /019,380, a related copending application.

The space problem is greatly complicated or impossible to solve when engines of increased length are to be used with coaxial transmissions of the prior art. Where simple manual transmissions are used it is not possible to substitute automatic transmissions of the prior art.

BRIEF DESCRIPTION OF THE PRESENT INVENTION

The present invention solves the problem in using a reduced size planetary coupling by compacting all essential parts in a novel manner at the front of a transmission housing utilizing an integral cup shaped output element which comprises the ring gear and an output gear with teeth coaxially and peripherally close and in which output element the planetary gearing is nested. The output element has a hollow shaft journaled in a bearing at the front of the housing. One side of the planet carrier has a shaft extending through a relatively short hollow hub of the output element beyond the front of the housing and carries a free wheel clutch the reaction ring of which is carried in a housing lid. The overall transmission is thus made very compact, eliminating any rear bearing and also eliminating other space consuming arrangements of the prior art as well as the weight of the parts thus eliminated by the novel arrangement. A drive gear meshing with the output gear is readily insertable in the housing through a circular front aperture closed by a plate secured by a springclip adding to the compactness of the transmission and simplicity of assembly.

A detailed description of the invention now follows in conjunction with the appended drawing in which:

FIG. 1 symbolically illustrates the combination;

FIG. 2 shows a cross section of the physical transmission; and

FIG. 3, in close relative proximity to FIG. 2 shows in phantom lines the end cover of a prior art transmission illustrating the extra bulk which is eliminated by the invention.

In FIG. 1 the entire speed change gear automatic transmission 1 and the hydrodynamic torque converter 2 disposed between an engine (not shown) and the transmission is shown. Instead of a hydrodynamic torque converter, a hydrodynamic coupling may be used.

The transmission comprises a reduced size planetary coupling gearing 3, shift couplings A, B, E, shift brakes C, C1, D and free wheel units F, G for the selective operation and shifting of gears.

The engine, the hydrodynamic torque converter, the planetary reducing coupling gear and output element 30 with hollow hub 30' are disposed coaxially with the couplings and brakes as well as the free wheel units in relation to one another and are installed transversely in the vehicle. The driving force is transmitted by output element 30 carrying output spur gear 31 transmitting power to the spur gears 51, 52 on the lateral shaft 5, and to gear 41 on the differential gear box 4 and thus to the axle driving halfshafts 42, 43.

For compactness, the output element 30 is cupped so that the planetary gearing can nest therein, obvious from FIG. 2.

In this example, the planetary coupling gear 3 is constructed as a so-called reduced sized coupling gear with only one ring gear 32 as an output which is connected with the output spur gear 31. The drive takes place dependent on the speed, for example:

in the 1st and 2nd gear by way of the 2nd sun gear 34;

in the 3rd gear by way of the 2nd sun gear 34 and the planetary carrier 35, in the 4th gear only by way of the planetary carrier 35 and in the R-gear by way of the 1st sun gear 33.

In the direction of the output the brake D and the free wheel unit G which are required in connection with the shifting of the 1st and of the reverse gear are connected in addition with the planetary carrier 35.

While the speed change gear shifting automatically remains unchanged viewed in an axial direction from the drive, up to the set of gears of the reduced sized planetary coupling gear, in the construction thereafter for identical gear function considerable novel constructional features are involved. Thus, as shown in FIG. 2, the output spur gear 31 is not disposed conventionally, as the last gear element adjacent an end cover as, e.g., an end cover 11A, FIG. 3. Output gear 31 is close to planetary system 3 in reduced size housing 11 as noted in FIG. 2.

The ring gear 32 is integrally connected with the driving spur gear 31 close to the teeth 310 that mesh with gear 51. The free wheel unit G is located rearwardly of the bearing 6, between the bearing and the gear housing cover 12, the cover not to be confused with FIG. 1 where for purposes of clear layout the free wheel unit G is between the planetary coupling gear 3 and the output spur gear 31. The shaft 320 (FIG. 2) connecting the free wheel unit G to the planetary carrier 35 extends through hub 30' of output element 30.

The free wheel unit G is built into the rear cover 12 which encloses the housing opening through which hub 30' and shaft 320 extend for convenient assembly with free wheel unit G and bearing 6. The free wheel unit G facilitates shifting.

Free wheel reaction ring G1 may be an internal component of cover 12, as FIG. 2 shows.

The brake D with the pressure piston D1 necessary for operation is disposed radially outward and directly in the axial plane of the coupling gear 3, so that a very short connection of the inside lamellae carrier D2 with the planetary carrier 35 is achieved. In the area of the output drive shaft 5 for spur gear 51 a flat, simple, circular closure cover 13 covers a circular rear cavity in the housing for gear 51. An annular spring 14 or snap ring secures the cover.

I claim:

1. A variable speed gear transmission for a motor vehicle having a prime mover located transversely of the direction of travel, said transmission being in a housing (11) and coaxially flanged for automatic speed change and having a hydrodynamic unit (2) including controls for said transmission comprising shift couplings (A, B, E) and shift brakes (C, C1, D) and free wheel units (F, G) including planetary gearing (3) comprising a ring gear (32), an output gear 31 and a planet carrier (35); including an output drive shaft (5) parallel to the axis of the planetary gearing, and on output drive gear (51) thereon meshing with said output gear (31);

the improvement comprising a reduced size planetary coupling gearing (3); an output element (30) integrally comprising the ring gear (32) of said planetary gearing and having teeth closely adjacent to the output gear (31) and to the teeth (310) thereof and having a hollow hub (30') extending forwardly in said housing (11); said housing at the front thereof having a bearing (6) and said hub being journaled therein;

a shaft (320) rotative with said planet carrier and extending through the bearing (6) and the hub (30') of said output element (30) and connecting to one free wheel unit (G) at the front of the housing (11), whereby a compact arrangement of components is effected for a transversely located transmission.

2. A transmission as set forth in claim 1, said one free wheel unit being disposed beyond said housing and a cover (12) secured to said housing enclosing said free wheel unit and including a free wheel reaction element (G1) within said cover.

3. A transmission as set forth in claim 1, said output element (30) being cupped and said planetary gearing nesting therein with a portion of said planet carrier disposed axially close to and spaced from said output element and extending radially to one said brake (D).

4. A transmission as set forth in claim 2, said output element (30) being cupped and said planetary gearing nesting therein with a portion of said planet carrier disposed axially close to and spaced from said output element and extending radially to one said brake (D).

* * * * *